US011175143B2

(12) United States Patent
Sakuma et al.

(10) Patent No.: US 11,175,143 B2
(45) Date of Patent: Nov. 16, 2021

(54) ELECTRIC EFFICIENCY PREDICTION METHOD FOR ELECTRICALLY POWERED VEHICLE, SERVER, AND ELECTRICALLY POWERED VEHICLE

(71) Applicant: TOYOTA JIDOSHA KABUSHIKI KAISHA, Toyota (JP)

(72) Inventors: Satoru Sakuma, Nagakute (JP); Shuhei Yamamoto, Aichi-ken (JP); Munehiro Kamiya, Anjo (JP); Hideo Hasegawa, Nagoya (JP); Shinji Kurachi, Nagoya (JP); Tomoya Shimizu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 16/182,094

(22) Filed: Nov. 6, 2018

(65) Prior Publication Data

US 2019/0137278 A1    May 9, 2019

(30) Foreign Application Priority Data

Nov. 8, 2017    (JP) .............................. JP2017-215585

(51) Int. Cl.
| *G08G 1/123* | (2006.01) |
| *G01C 21/20* | (2006.01) |
| *B60L 58/12* | (2019.01) |
| *G01C 21/34* | (2006.01) |
| G06F 19/00 | (2018.01) |
| G06G 7/70 | (2006.01) |
| G06G 7/76 | (2006.01) |

(52) U.S. Cl.
CPC .............. *G01C 21/20* (2013.01); *B60L 58/12* (2019.02); *G01C 21/3469* (2013.01)

(58) Field of Classification Search
CPC ................ G01C 21/20; G01C 21/3469; G01C 21/3682; B60L 58/12; B60L 15/20; G06F 17/00; B60W 10/08; B60W 20/00
USPC .......................................... 701/532, 22, 123
See application file for complete search history.

(56) References Cited

U.S. PATENT DOCUMENTS

2012/0143413 A1* 6/2012 Cho .................... B60L 15/2045
701/22
2013/0079962 A1   3/2013 Ishikawa et al.
(Continued)

FOREIGN PATENT DOCUMENTS

JP    2010243305 A    10/2010
JP    2013070515 A    4/2013
(Continued)

OTHER PUBLICATIONS

IP.com Search.*

*Primary Examiner* — Mahmoud S Ismail
(74) *Attorney, Agent, or Firm* — Hunton Andrews Kurth LLP (57) ABSTRACT

An electric efficiency prediction method for a vehicle includes: the first step of obtaining "object vehicle information" showing information about a status of use of a vehicle that is an electrically powered vehicle; and the second step of, for each link connecting nodes virtually set on an expected traveling route of the vehicle, by using the object vehicle information, correcting an electric efficiency actual value of electric efficiency collected from each of a plurality of vehicles to calculate an electric efficiency predicted value in each link for the vehicle.

5 Claims, 10 Drawing Sheets

(56) References Cited

U.S. PATENT DOCUMENTS

| | | | | |
|---|---|---|---|---|
| 2013/0238230 A1* | 9/2013 | Onogi | ................ | G06F 17/00 |
| | | | | 701/123 |
| 2013/0332020 A1* | 12/2013 | Uchihara | .......... | B60W 50/0097 |
| | | | | 701/22 |
| 2014/0217976 A1* | 8/2014 | McGrath | ................ | B60L 53/54 |
| | | | | 320/109 |
| 2015/0354974 A1 | 12/2015 | Takehara et al. | | |
| 2018/0045533 A1* | 2/2018 | Jackson | ............. | G01C 21/3682 |

FOREIGN PATENT DOCUMENTS

| JP | 2015052521 A | 3/2015 |
|---|---|---|
| JP | 2015-230719 A | 12/2015 |
| JP | 2016223784 A | 12/2016 |

\* cited by examiner

<VEHICLE INFORMATION>

| VEHICLE ID | VEHICLE TYPE | VEHICLE WEIGHT | CURRENT LOCATION | DESTINATION | FULLY CHARGED CAPACITY | SOC | DRIVING TENDENCY |
|---|---|---|---|---|---|---|---|
| V00001 | | | | | | | |
| V00002 | | | | | | | |
| V00003 | | | | | | | |
| V00004 | | | | | | | |
| ⋮ | | | | | | | |

FIG.5 <CHARGING INFORMATION>

| CHARGING STATION ID | LOCATION | CHARGING STANDARDS | NUMBER OF AVAILABLE CHARGERS |
|---|---|---|---|
| S00001 | | | |
| S00002 | | | |
| S00003 | | | |
| ⋮ | | | |

FIG.6

<ELECTRIC EFFICIENCY INFORMATION>

| LINK ID | VEHICLE TYPE | ELECTRIC EFFICIENCY ACTUAL VALUE |
|---|---|---|
| L00001 | K00001 | |
| | K00002 | |
| | K00003 | |
| | ⋮ | |
| L00002 | K00001 | |
| | K00002 | |
| | K00003 | |
| | ⋮ | |
| L00003 | K00001 | |
| | K00002 | |
| | K00003 | |
| | ⋮ | |
| ⋮ | ⋮ | |

FIG.7

<CORRECTION MAP>

| FACTOR | SECTION | CORRECTION COEFFICIENT |
|---|---|---|
| LOAD AMOUNT | W1 | |
| | W2 | |
| | W3 | |
| | ⋮ | |
| AIR CONDITIONING CONDITIONS | $\Delta T1$ | |
| | $\Delta T2$ | |
| | $\Delta T3$ | |
| | ⋮ | |
| DRIVING TENDENCY | D00001 | |
| | D00002 | |
| | D00003 | |
| | ⋮ | |
| WEATHER CONDITIONS | C00001 | |
| | C00002 | |
| | C00003 | |
| | ⋮ | |
| TRAFFIC CONGESTION STATUS | J00001 | |
| | J00002 | |
| | J00003 | |
| | ⋮ | |

ELECTRIC EFFICIENCY PREDICTION METHOD FOR ELECTRICALLY POWERED VEHICLE, SERVER, AND ELECTRICALLY POWERED VEHICLE

This nonprovisional application is based on Japanese Patent Application No. 2017-215585 filed on Nov. 8, 2017 with the Japan Patent Office, the entire contents of which are hereby incorporated by reference.

BACKGROUND

Field

The present disclosure relates to an electric efficiency prediction method for an electrically powered vehicle, a server, and an electrically powered vehicle.

Description of the Background Art

In recent years, electrically powered vehicles such as an electric vehicle (EV) and a plug-in hybrid vehicle (PHV) have been under development. It is expected that such electrically powered vehicles will become widespread in the future. In each of these electrically powered vehicles, exhaustion of electric power stored in a power storage device may occur (that is, running out of electricity). In particular, it is feared that an electric vehicle running out of electricity may stop on a road. From the point of view as described above, for example, it is desired to calculate electric efficiency (the amount of power consumption per unit traveling distance) of an electrically powered vehicle on an expected traveling route as accurately as possible.

For example, Japanese Patent Laying-Open No. 2015-230719 discloses that the point at which the state of charge (SOC) of a power storage device becomes equal to or less than a threshold value is calculated based on the electric efficiency uniquely obtained from the information about the vehicle type (for example, see claim 5 in Japanese Patent Laying-Open No. 2015-230719).

SUMMARY

In Japanese Patent Laying-Open No. 2015-230719, the information about the electric efficiency is classified by vehicle types and stored in storing means in a management center. Also, Japanese Patent Laying-Open No. 2015-230719 discloses that electric efficiency is calculated based on the vehicle type information (for example, see paragraphs [0035] and [0082] in Japanese Patent Laying-Open No. 2015-230719).

However, the electric efficiency may be influenced also by factors other than the vehicle type. The technique disclosed in Japanese Patent Laying-Open No. 2015-230719 takes no consideration of other factors, so that there is still room for improvement in accuracy of predicting the electric efficiency.

The present disclosure has been made to solve the above-described problems. An object of the present disclosure is to provide a technique by which the accuracy of predicting electric efficiency of an electrically powered vehicle can be improved.

(1) An electric efficiency prediction method for an electrically powered vehicle according to an aspect of the present disclosure includes: the first step of obtaining object vehicle information including information about a status of use of an object vehicle that is an electrically powered vehicle; and the second step of, for each link connecting nodes virtually set on an expected traveling route of the object vehicle, by using the object vehicle information, correcting an electric efficiency actual value collected from each of a plurality of vehicles to calculate an electric efficiency predicted value in each link for the object vehicle, each of the plurality of vehicles being an electrically powered vehicle.

(2) The electric efficiency prediction method for an electrically powered vehicle includes: the third step of calculating a prediction point at which a state of charge (SOC) of a power storage device mounted in the object vehicle falls below a prescribed value, by using (i) location information about a charging facility capable of supplying charging power to the power storage device, and (ii) the electric efficiency predicted value in each link for the object vehicle; and the fourth step of providing the object vehicle with the location information about the charging facility provided in a vicinity of the prediction point.

(3) The object vehicle information includes at least one of information about a load amount of the object vehicle, information about an operation state of an air conditioner of the object vehicle, and information about a driving tendency of a driver of the object vehicle.

According to the method described in the above (1) to (3), when predicting the electric efficiency in each link for the object vehicle, the electric efficiency actual value is corrected using the object vehicle information (more specifically, the information about the load amount of a vehicle, the operation state of an air conditioner, the driving tendency of a driver, and the like), thereby calculating an electric efficiency predicted value. In this way, the state of the object vehicle that may influence the electric efficiency can be reflected in the electric efficiency predicted value, so that the accuracy of predicting the electric efficiency of the object vehicle can be improved.

(4) A server according to another aspect of the present disclosure is configured to predict electric efficiency of an electrically powered vehicle. The server includes storage and a processor. The storage is configured to store (i) map information including a link connecting nodes virtually set on a road, and (ii) electric efficiency information including an electric efficiency actual value calculated based on an electric efficiency result in each link, the electric efficiency result being collected from each of a plurality of vehicles. The processor is configured to, for each link on an expected traveling route of an object vehicle, by using information about a status of use of the object vehicle, correct the electric efficiency actual value stored in the storage to predict electric efficiency in each link for the object vehicle.

(5) An electrically powered vehicle according to still another aspect of the present disclosure includes: a wireless communication device configured to wirelessly communicate with outside the electrically powered vehicle; and a processor. The processor is configured to, for each link on an expected traveling route of the electrically powered vehicle, by using information about a status of use of the electrically powered vehicle, correct an electric efficiency actual value obtained by the wireless communication device to predict electric efficiency in each link for the electrically powered vehicle. The electric efficiency actual value is calculated based on an electric efficiency result collected from each of a plurality of vehicles.

According to the configurations described in the above (4) and (5), the accuracy of calculating electric efficiency of the electrically powered vehicle can be improved as in the method described in the above (1).

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Embodiments of the present disclosure will be hereinafter described in detail with reference to the accompanying drawings, in which the same or corresponding components are designated by the same reference characters, and the description thereof will not be repeated.

First Embodiment

<Entire Configuration of Electric Efficiency Prediction System>

Figure 1:
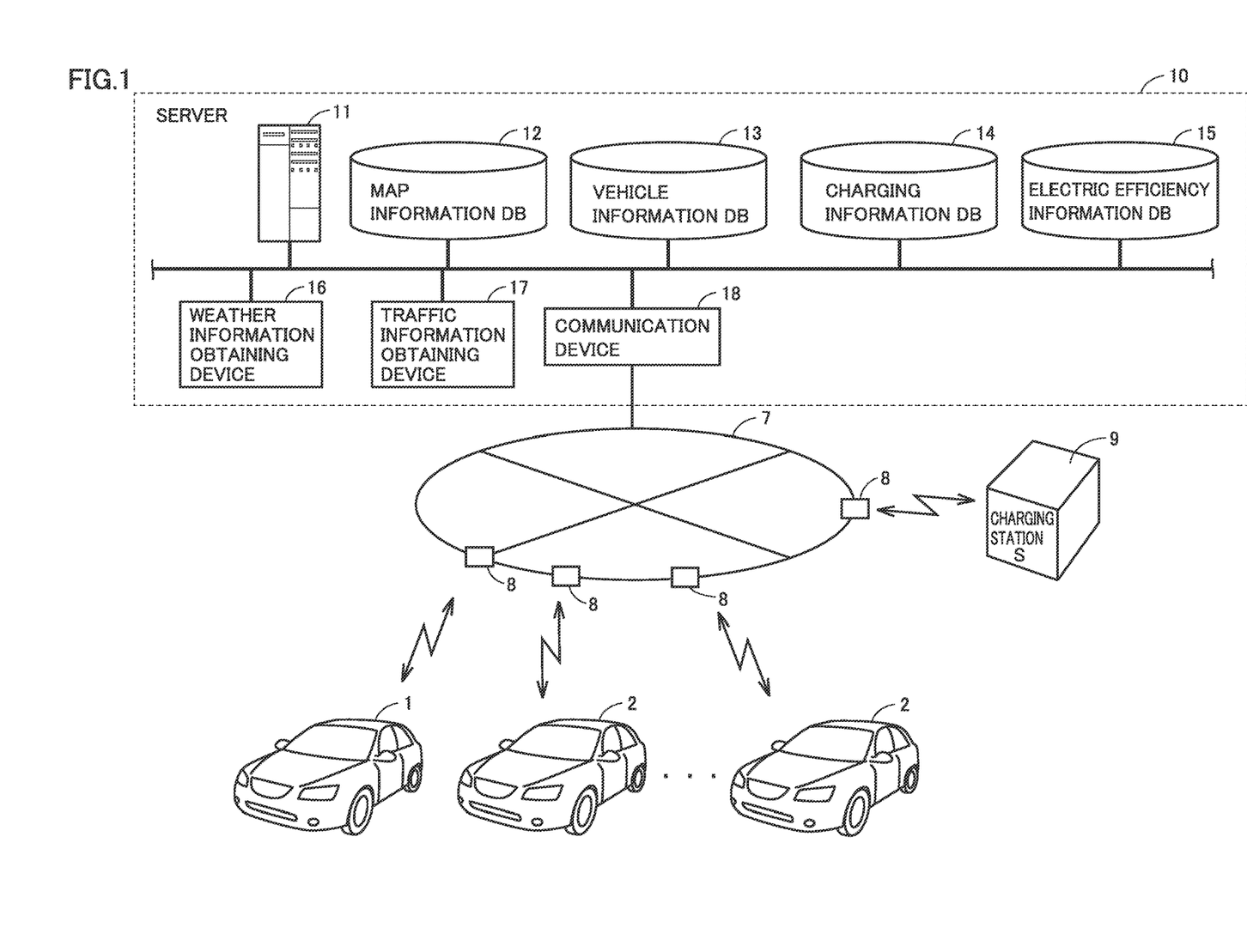
FIG. 1 is a diagram schematically showing the entire configuration of an electric efficiency prediction system according to the present embodiment.

FIG. 1 is a diagram schematically showing the entire configuration of an electric efficiency prediction system according to the first embodiment. Referring to FIG. 1, in this electric efficiency prediction system, a server 10 predicts electric efficiency of each of a plurality of vehicles, and provides each of the vehicles with the information about the predicted electric efficiency.

Vehicle 1 is a user's vehicle, for which the electric efficiency is predicted in the example described below (an object vehicle). On the other hand, a plurality of vehicles 2 are vehicles other than the user's vehicle, and typically include an excessively large number of (for example, several ten thousand to several million) vehicles.

Each of vehicle 1 and the plurality of vehicles 2 is an electric vehicle (EV). However, each of vehicles 1 and 2 only has to be chargeable from outside (externally chargeable), and may be a plug-in hybrid vehicle (PHV).

Server 10 is configured to bidirectionally communicate with a plurality of vehicles including vehicles 1 and 2 through a base station 8 provided over a communication network 7. Furthermore, server 10 is configured to bidirectionally communicate also with a plurality of charging stations including a charging station 9 through communication network 7 and base station 8. Although FIG. 1 shows only one charging station 9, there may be further more charging stations (for example, charging stations A and B, which will be described later).

Server 10 includes a processor 11, a map information database 12, a vehicle information database 13, a charging information database 14, an electric efficiency information database 15, a weather information obtaining device 16, a traffic information obtaining device 17, and a communication device 18.

Map information database 12 stores map information used by each of vehicles 1 and 2 for performing a route searching process. The map information includes information about the link connecting nodes virtually set on a road.

Vehicle information database 13 stores, regarding each of vehicles 1 and 2, vehicle type information, information about various specification values (catalog values) defined in accordance with vehicle types, information showing the status of use of power storage device 20 (see FIG. 2), and the like.

Charging information database 14 stores location information about a charging station, information about a charger provided in the charging station, and the like.

Electric efficiency information database 15 stores electric efficiency information collected from each of vehicles 1 and 2. Each of vehicles 1 and 2 transmits the information used for calculating the electric efficiency to the server through a wireless communication device 40 (see FIG. 2) periodically or whenever prescribed conditions are satisfied. Electric efficiency information database 15 stores the electric efficiency information organized by vehicle types based on the information received from each of vehicles 1 and 2.

The details of the information stored in each of these databases will be described later in detail with reference to FIGS. 3 to 6. Map information database 12 and electric efficiency information database 15 each correspond to the "storage" according to the present disclosure.

Weather information obtaining device 16 obtains the latest weather information provided, for example, from the Meteorological Agency (which may be a private weather forecasting company). The obtained weather information may be stored in a database (not shown).

Traffic information obtaining device 17 obtains the latest road traffic information provided, for example, from a road traffic information center. The obtained road traffic information may be stored in a database (not shown).

Communication device 18 is configured to wirelessly data-communicate with wireless communication device 40 (see FIG. 2) mounted in each of vehicles 1 and 2. Communication device 18 allows bidirectional communication between processor 11 and communication network 7.

Processor 11 is configured to include a central processing unit (CPU), a memory, an input/output port through which various signals are input and output, and the like, which are not shown. Processor 11 predicts the electric efficiency of vehicle 1 traveling on the expected traveling route based on (i) the information stored in each of the databases, (ii) the information obtained from outside by traffic information obtaining device 17 and weather information obtaining device 16, and (iii) the information received from vehicle 1. This process will be referred to as an "electric efficiency predicting process", which will be described later in detail.

<Vehicle Configuration>

Since vehicles 1 and 2 have basically a common configuration, the configuration of vehicle 1 will be representatively described in the following.

Figure 2:
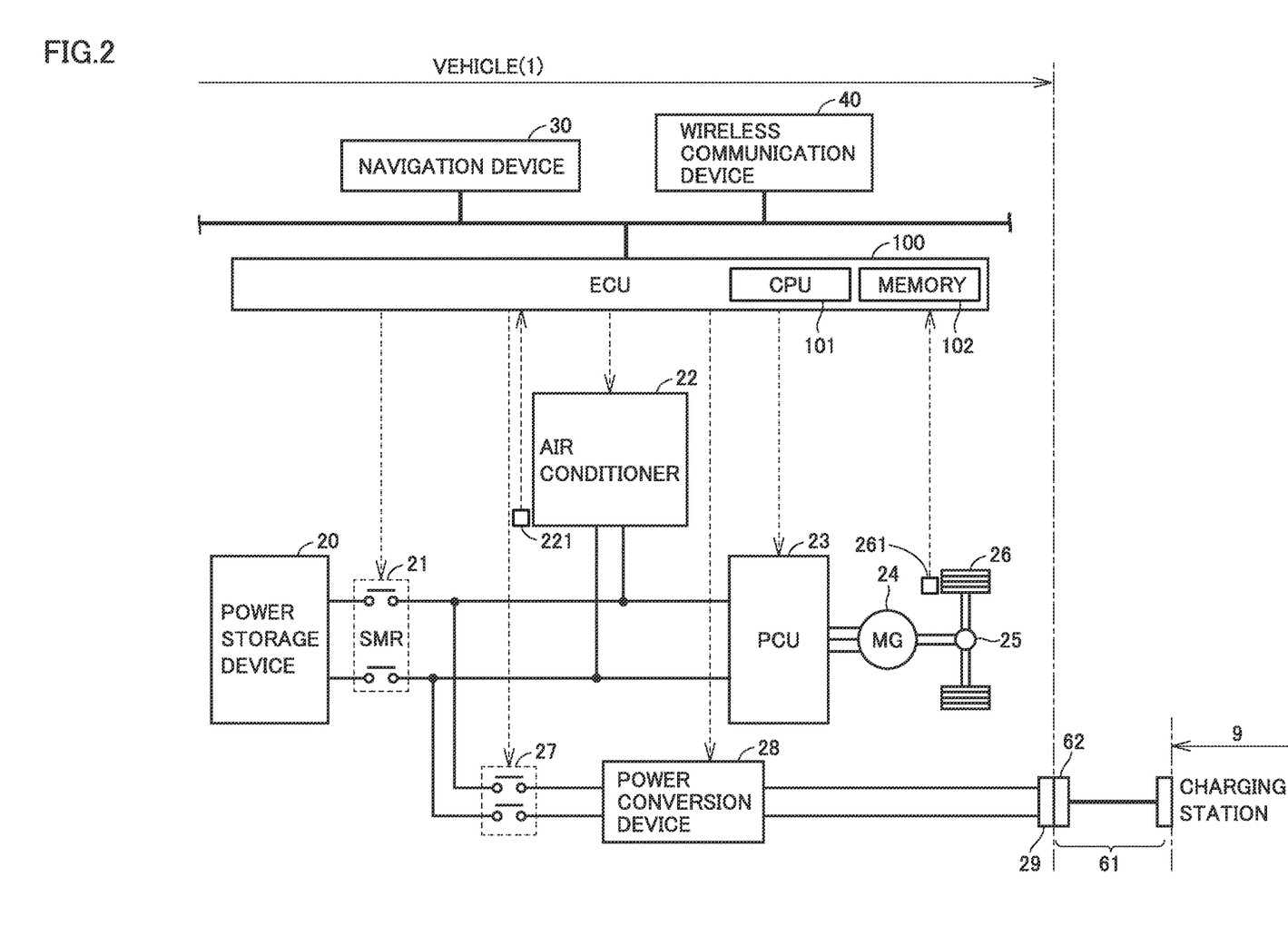
FIG. 2 is a diagram schematically showing the configuration of a vehicle.

FIG. 2 is a diagram schematically showing the configuration of vehicle 1. Referring to FIG. 2, vehicle 1 includes a power storage device 20, a system main relay (SMR) 21, an air conditioner 22, a power control unit (PCU) 23, a motor generator (MG) 24, a power transmission gear 25, a driving wheel 26, and an electronic control unit (ECU) 100.

Power storage device 20 is a rechargeable direct-current (DC) power supply, and configured to include a secondary battery such as a lithium-ion secondary battery or a nickel-metal hydride battery. As power storage device 20, capacitors such as an electric double layer capacitor can also be employed. Power storage device 20 supplies, to PCU 23, electric power for generating driving force for traveling of vehicle 1. Furthermore, power storage device 20 is charged with electric power generated by regenerative braking of motor generator 24 or charged with electric power supplied from outside the vehicle.

SMR 21 is electrically connected between power storage device 20 and PCU 23. SMR 21 is controlled to be opened/closed according to the command from ECU 100.

Air conditioner 22 is electrically connected between SMR 21 and PCU 23. Air conditioner 22 performs air-conditioning (heating or cooling) the vehicle cabin of vehicle 1 using the electric power supplied from power storage device 20. Air conditioner 22 is provided with a current sensor 221 configured to detect the current supplied to air conditioner 22.

PCU 23 performs power conversion between power storage device 20 and motor generator 24 according to the command from ECU 100. PCU 23 is configured to include an inverter (not shown) configured to receive electric power from power storage device 20 to drive motor generator 24, a converter (not shown) configured to adjust the level of the DC voltage supplied to the inverter, and the like.

Motor generator 24 is an alternating-current (AC) electric motor, which is, for example, a permanent-magnet type synchronous electric motor having a rotor incorporating a permanent magnet. Motor generator 24 is driven by the inverter included in PCU 23 to rotate the drive shaft (not shown). The torque output from motor generator 24 is transmitted to driving wheel 26 through power transmission gear 25, thereby driving vehicle 1 to travel. Furthermore, during braking of the vehicle, motor generator 24 receives the rotating force of each driving wheel to generate electric power. The electric power generated by motor generator 24 is stored in power storage device 20 through PCU 23. In addition, vehicle 1 has a suspension provided with a sensor 261 (for example, a stroke sensor) configured to detect the sinking amount of the suspension.

Vehicle 1 further includes a charging relay 27, a power conversion device 28 and an inlet 29 each as a configuration for performing external charging. During external charging of power storage device 20, a charging connector 62 of charging cable 61 is coupled to inlet 29. Then, the electric power supplied from a charger or the like provided in charging station 9 is supplied to vehicle 1 through charging cable 61.

Charging relay 27 is electrically connected between power storage device 20 and power conversion device 28. Charging relay 27 is closed and SMR 21 is closed to thereby allow power transfer between inlet 29 and power storage device 20.

Power conversion device 28 is electrically connected between charging relay 27 and inlet 29. According to the command from ECU 100, power conversion device 28 converts the electric power supplied from the charger or the like into electric power with which power storage device 20 can be charged. In addition, power conversion device 28 can also convert the electric power from power storage device 20 into electric power that can be output to the outside of the vehicle.

Vehicle 1 further includes a navigation device 30 and a wireless communication device 40 as the configuration for grasping the traveling conditions of vehicle 1 and for communicating with the outside of the vehicle.

Navigation device 30 includes a GPS receiver (not shown) configured to specify the current location of vehicle 1 based on radio waves from artificial satellites, and a touch panel-equipped display (not shown). Navigation device 30 performs various types of navigation processes for vehicle 1 using the location information about the current location of vehicle 1 specified by the GPS receiver (GPS information). More specifically, based on the GPS information about vehicle 1 and the road map data stored in the memory (not shown), navigation device 30 calculates a traveling route (an expected traveling route or a target route) from the current location of vehicle 1 to its destination, and outputs the information about the traveling route to ECU 100. Furthermore, navigation device 30 also causes the touch panel-equipped display to display the current location of vehicle 1 overlaid on the road map, and to display the information transmitted from processor 11 to vehicle 1 or the information from ECU 100. Furthermore, navigation device 30 receives various operations performed by the user through the touch panel-equipped display.

Wireless communication device 40 is configured to allow bidirectional data communication with base station 8 in communication network 7.

ECU 100 is configured to include a CPU 101, a memory 102, an input/output port (not shown), and the like. ECU 100 controls each of devices (SMR 21, air conditioner 22, PCU 23, charging relay 27, power conversion device 28, and the like) in vehicle 1 such that vehicle 1 is brought into a desired state. Furthermore, ECU 100 transmits and receives various pieces of information (location information about vehicle 1 and the like) to and from processor 11 through wireless communication device 40.

<Data Structure of Each Data>

Then, the information stored in each of the databases in server 10 shown in FIG. 1 will be hereinafter described in detail.

Figure 3:
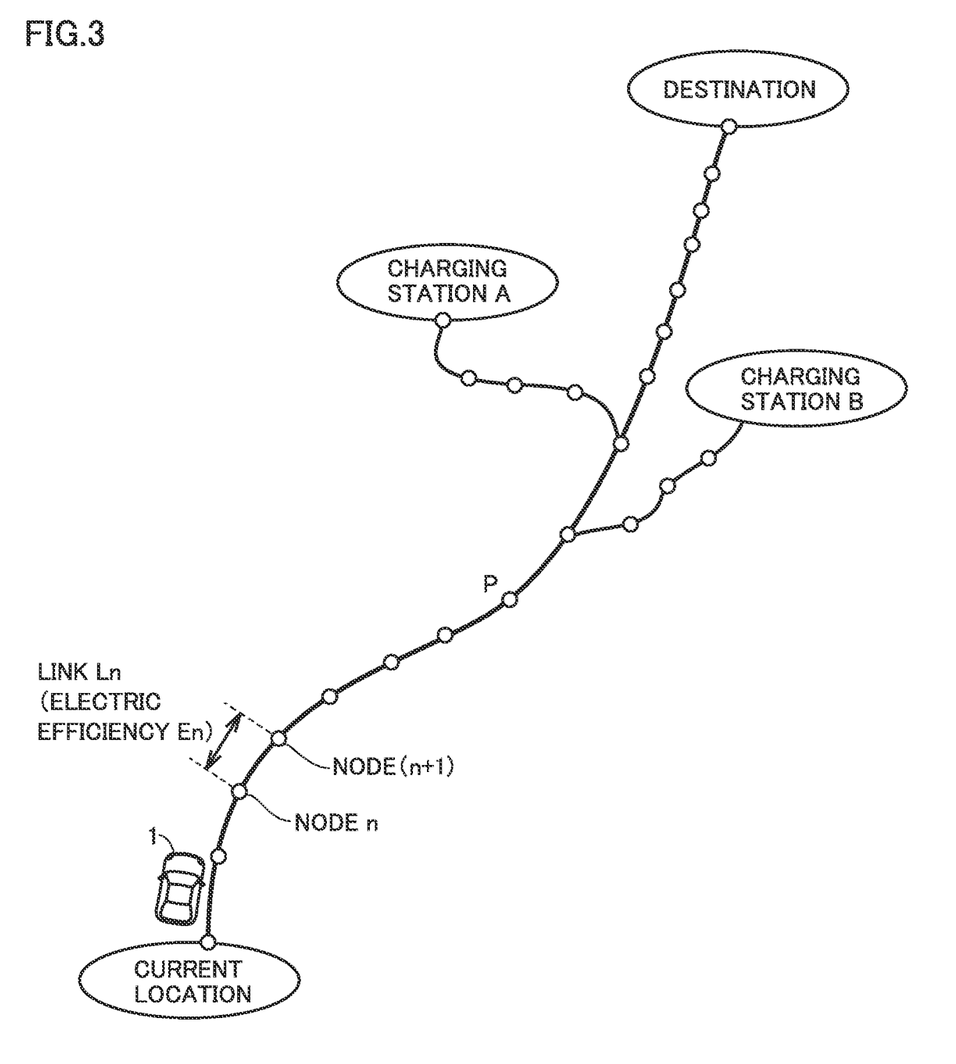
FIG. 3 is a diagram for illustrating map information stored in a map information database.

FIG. 3 is a diagram for illustrating map information stored in map information database 12. As shown in FIG. 3, the data used as map information is obtained based on the configuration in which the traveling route of a vehicle is divided into a plurality of sections including traffic intersections and the like as nodes between which a link is defined to extend. FIG. 3 shows a link Ln connecting the n-th node and the (n+1)-th node on the expected traveling route from the present location of vehicle 1 to the destination thereof. In this case, n is a natural number.

When there is a possibility that vehicle 1 may run out of electricity before this vehicle 1 arrives at its destination, for example, at a point P where the SOC of power storage device 20 of vehicle 1 falls below a prescribed value, vehicle 1 can issue a request to server 10 to provide the location information about charging station 9 (charging stations A and B in FIG. 3) in the vicinity of point P, for example, before vehicle 1 runs out of electricity. The details of this process will be described later.

Figure 4:
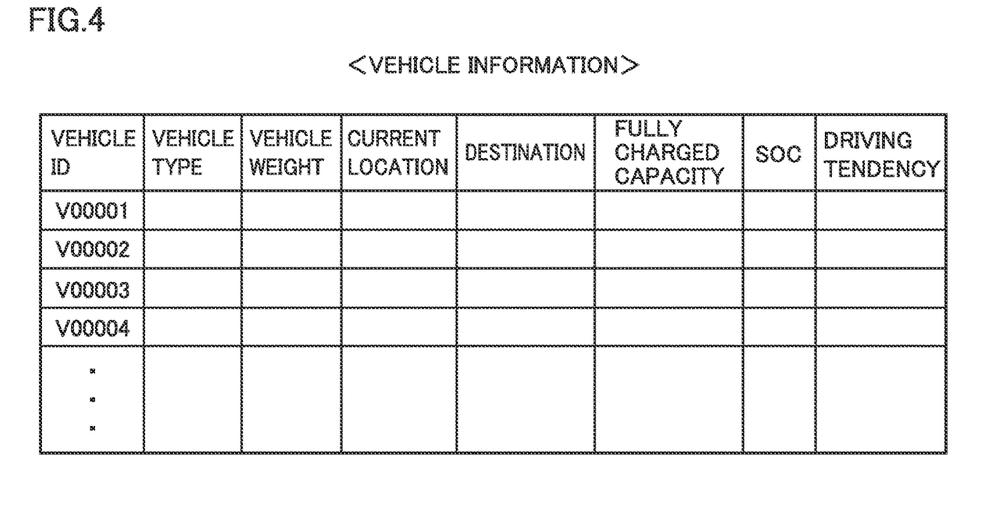
FIG. 4 is a diagram for illustrating an example of the data structure of vehicle information stored in a vehicle information database.

FIG. 4 is a diagram for illustrating an example of the data structure of vehicle information stored in vehicle information database 13. Referring to FIG. 4, the vehicle information includes information about various vehicles (vehicles 1 and 2), for example, regarding vehicle identification information (ID), vehicle type, vehicle weight (the weight of a vehicle alone not including a vehicle occupant, baggage and the like), the current location and the destination of a vehicle, and the like. The information about the vehicle type and the vehicle weight can be registered in advance. Furthermore, as the information about the current location, the destination and the like of the vehicle, the information obtained (or set) by navigation device 30 can be periodically collected.

Furthermore, the vehicle information includes the information about the fully charged capacity of power storage device 20 and the information about the SOC of power storage device 20. The information about the fully charged capacity of power storage device 20 may be specification values about the fully charged capacity of power storage device 20. Also, the fully charged capacity generally decreases in accordance with deterioration of power storage device 20. Accordingly, the actual value of the fully charged capacity calculated in the vehicle (the value factoring in the decreased amount caused by deterioration of power storage device 20) may be obtained. The information about the SOC of power storage device 20 can be periodically collected from the vehicle.

The vehicle information further includes the information showing the driving tendency of a user (a driver) of a vehicle (driving tendency information), which will be described later in detail. It is to be noted that a plurality of users may share one vehicle. Accordingly, it is desirable that the driving tendency information is defined for each user. Specifically, in the case of a home use vehicle, a user can be distinguished by the position of the driver's seat. Furthermore, when a plurality of keys (so-called smart keys) are allocated to a vehicle, the plurality of keys include different pieces of identification information. Thus, users can be distinguished from one another by communication between the vehicle and each of the keys. On the other hand, in the case of a vehicle for sharing use (also including a rental vehicle), the user information that is registered at the time of renting a vehicle and the driving tendency information can be associated with each other.

Figure 5:
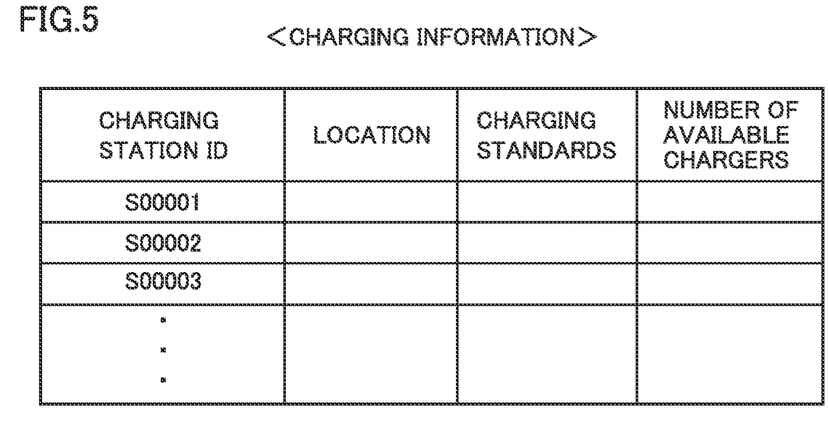
FIG. 5 is a diagram for illustrating an example of the data structure of charging information stored in a charging information database.

FIG. 5 is a diagram for illustrating an example of the data structure of charging information stored in charging information database 14. Referring to FIG. 5, the charging information includes: the identification information of a charging station; the location information about a charging station; the information about the charging standards appropriate for each charger provided in a charging station (charging formats such as quick charging and normal charging); and the information about the status of use of each charger. The information about the status of use of each charger is, for example, the information about the number of chargers in use and the number of available chargers. Although not shown, the charging information may also further include the information about the fee for charging (the information showing the charged fee per unit amount of charging power or the charged fee per unit time of charging).

Figure 6:
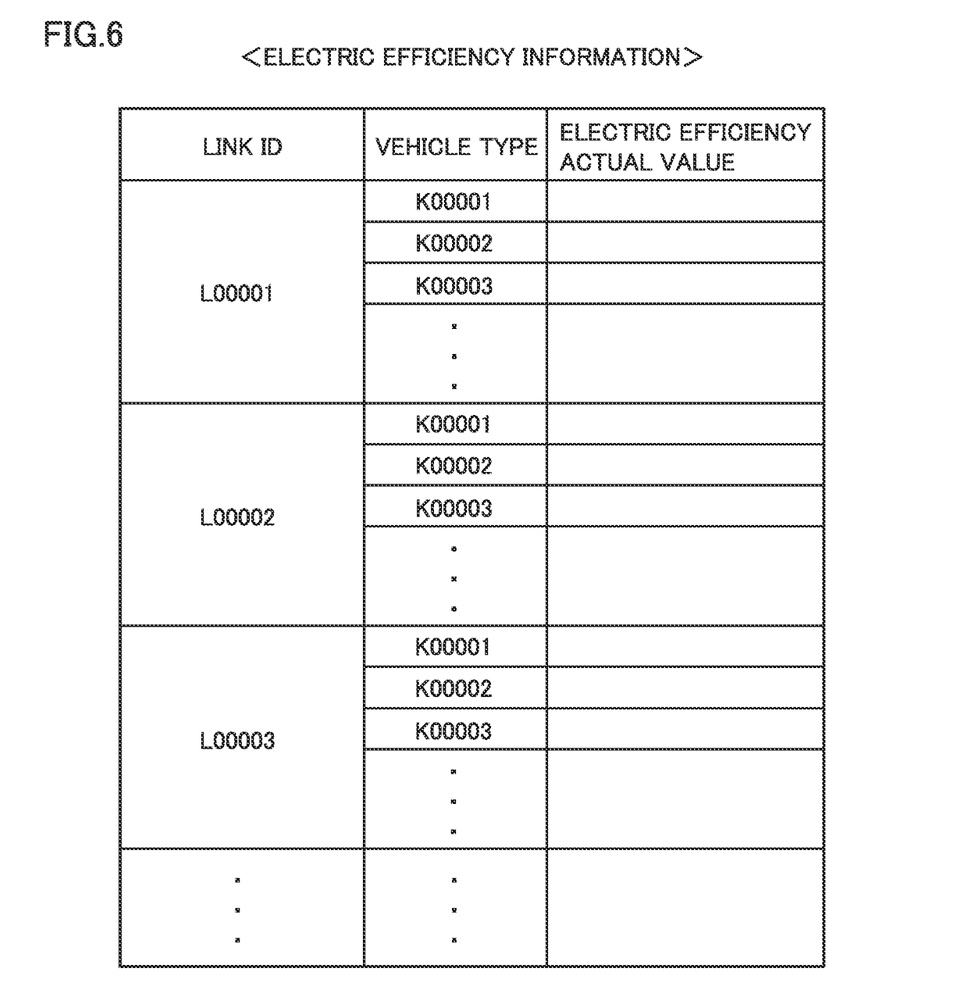
FIG. 6 is a diagram for illustrating an example of the data structure of charging information stored in an electric efficiency information database.

FIG. 6 is a diagram for illustrating an example of the data structure of charging information stored in electric efficiency information database 15. Referring to FIG. 6, for each link described with reference to FIG. 3, the electric efficiency information includes the information (so-called big data) about an electric efficiency actual value [unit: kWh/km] in each link collected from each of a plurality of vehicle 2 (which may also include vehicle 1). This electric efficiency actual value in each link is calculated by each vehicle type. The electric efficiency actual value may be calculated by an average value, a median value or a most frequent value among the electric efficiency results obtained from the plurality of vehicles 2. Alternatively, any statistical process other than the above may be performed.

In addition, as the electric efficiency actual value, server 10 may receive the actual value calculated in the vehicle. Alternatively, server 10 may receive the information about the amount of power consumption in place of electric efficiency. Server 10 can also calculate electric efficiency based on the traveling distance of vehicle 2 in which this amount of power is consumed.

<Accuracy of Predicting Electric Efficiency>

When the electric efficiency of vehicle 1 on the expected traveling route is predicted, it is also conceivable to refer to the electric efficiency information shown in FIG. 6 and thereby use the value obtained when another vehicle 2 of the same vehicle type as vehicle 1 (which may also include vehicle 1) actually travels in the past (the electric efficiency actual value). However, the electric efficiency may be influenced also by factors other than the vehicle type. Accordingly, there may be a possibility that the electric efficiency cannot be calculated with high accuracy when merely the electric efficiency actual values of the same vehicle type are employed but when other factors (described later) are not taken into consideration.

Thus, the present embodiment employs the configuration in which the electric efficiency actual value in each link included in the electric efficiency information is corrected using the information about the status of use of vehicle 1, thereby calculating the electric efficiency predicted value in each link on the expected traveling route of vehicle 1. The electric efficiency actual value can be corrected using a correction map that is prepared in advance.

Figure 7:
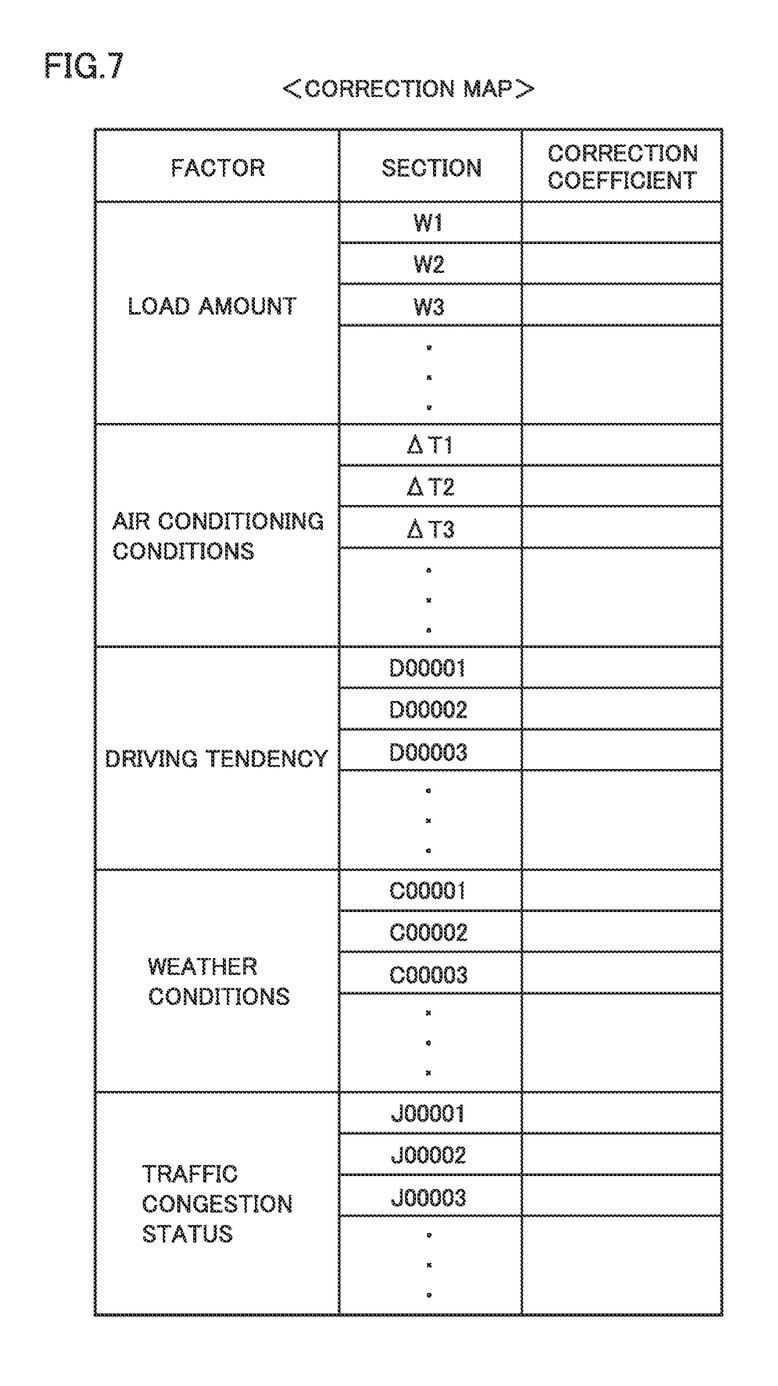
FIG. 7 is a diagram showing an example of a correction map.

FIG. 7 is a diagram showing an example of a correction map. This correction map is stored in electric efficiency information database 15, for example. The correction map includes, as parameters, the load amount of vehicle 1, the operation state of the air conditioner (which will be hereinafter described as air conditioning conditions), the driving tendency of a driver, the weather conditions, and the traffic congestion status of a traveling route.

It is known that the vehicle weight influences the electric efficiency. The weight of the vehicle itself (vehicle weight) is already known and included in the vehicle information (see FIG. 4). Accordingly, for example, the influence caused by deterioration of the electric efficiency due to the weight increased by a vehicle occupant, baggage and the like is corrected based on the electric efficiency with the weight of the vehicle alone.

Although not shown, the load amount (the increased amount of weight based on the vehicle weight as a reference) can be estimated by various methods. For example, the load amount can be estimated by detecting the sinking amount of a suspension by sensor 261 (see FIG. 2). Furthermore, the load amount may be estimated from the amount of change shown by a pneumatic sensor (not shown) for tires before and after a vehicle occupant gets in the vehicle. A load sensor (not shown) may be installed in each seat.

Furthermore, the relation among the load amount, the accelerator pedal position and the acceleration during vehicle acceleration on a flat road may be obtained in advance by an experiment and may be prepared as a separate map (not shown). By referring to this map, the load amount can be estimated from the accelerator pedal position and the acceleration.

Furthermore, the number of vehicle occupants can be detected by placing a camera taking photographs and moving images of the inside of a vehicle cabin. Alternatively, the approximate number of vehicle occupants can also be estimated based on the operation of opening and closing the door, which is performed before traveling of the vehicle. By way of example, when the door of the passenger's seat is opened and closed, but when the backseat door is not opened and closed, the number of vehicle occupants can be estimated as two including one in a driver's seat and one in a passenger's seat. By multiplying the number of vehicle occupants obtained in this way by a typical body weight of a vehicle occupant (an average body weight or the like), the load amount (the amount of weight increased by vehicle occupants) can also be estimated.

The power consumption (or the amount of power consumption) by air conditioner 22 may exert an influence upon the electric efficiency of vehicle 1, and therefore, is desirable to be taken into consideration when correcting the electric efficiency. The power consumption of air conditioner 22 can be calculated based on the cooling/heating setting, the air flow volume strength, the temperature difference between the outside air temperature and the set temperature, and the like. Furthermore, the power consumption of air conditioner 22 can also be calculated by monitoring the current supplied to air conditioner 22, for example, using current sensor 221.

The driving tendencies (habits of the driving operation) are different for each driver. There are some drivers who always try to drive a vehicle with excellent electric efficiency whereas there are some drivers who do not particularly care about electric efficiency. Accordingly, the electric efficiency is corrected also in consideration of the driving tendency of a driver. In addition, the driving techniques (skills) for driving the vehicle to travel with low electric consumption are also different depending on drivers. Such the driving techniques may also be included in the driving tendency used herein.

The driving tendency of a driver can generally be obtained from the electric efficiency actual value obtained during normal traveling (during traveling in which there is no possibility of running out of electricity). For example, the electric efficiency at the time when vehicle 1 travels in a link in a time zone is compared with the electric efficiency at the time when another vehicle of the same vehicle type as vehicle 1 travels in the same link in the same time zone. In general, a number of samples needs to be large to some extent in order to ensure statistical reliability. Accordingly, it is desirable that the number of another vehicle to be compared is as large as possible, and it is also desirable that the number of links to be compared is as large as possible. As a result of the comparison as described above, for the driver of vehicle 1, an index value that can be calculated implements the electric efficiency that is 5% higher (or 3% lower), for example, as compared with a typical driver of the vehicle of the same vehicle type. This index value can be used as a correction coefficient.

Weather conditions may also influence the electric efficiency. The weather conditions specifically means conditions of: weathers (fine weather, cloudy weather, rainy weather, and the like); an outside air temperature; a wind speed; a wind direction; an atmospheric pressure; and the like. The information about the weather conditions is obtained from the Meteorological Agency and the like through weather information obtaining device 16. The influence exerted upon the electric efficiency by these weather conditions can be obtained by experiments or simulations and thereby quantified. The index quantified in this way can be used as a correction coefficient.

In general, when traffic congestion occurs on a traveling route of a vehicle, the electric efficiency deteriorates as compared with the case where the vehicle can smoothly travel on the traveling route. Accordingly, the information about the degree of traffic congestion on the traveling route is used for correcting the electric efficiency. By way of example, the degree of traffic congestion is indexed by the "congestion degree" obtained by dividing the designed traffic capacity on each road by the actually measured traffic volume. For example, when the congestion degree on a road is equal to or less than 1 (when the actually measured traffic volume is equal to or less than the designed traffic capacity), no congestion occurs on the road, so that each vehicle can smoothly travel. However, when the congestion degree exceeds 2, it is determined that congestion chronically occurs on the road. The information about the congestion state on a traveling route is obtained from a road traffic information center and the like through traffic information obtaining device 17.

The correction map shown in FIG. 6 shows an example in which a correction coefficient is set so as to correspond to each of five parameters. However, the matrix showing combinations of these five parameters (five-dimensional matrix) may be created, and then, the correction coefficient may be set for each combination.

<Electric Efficiency Predicting Process Flow>

Figure 8:
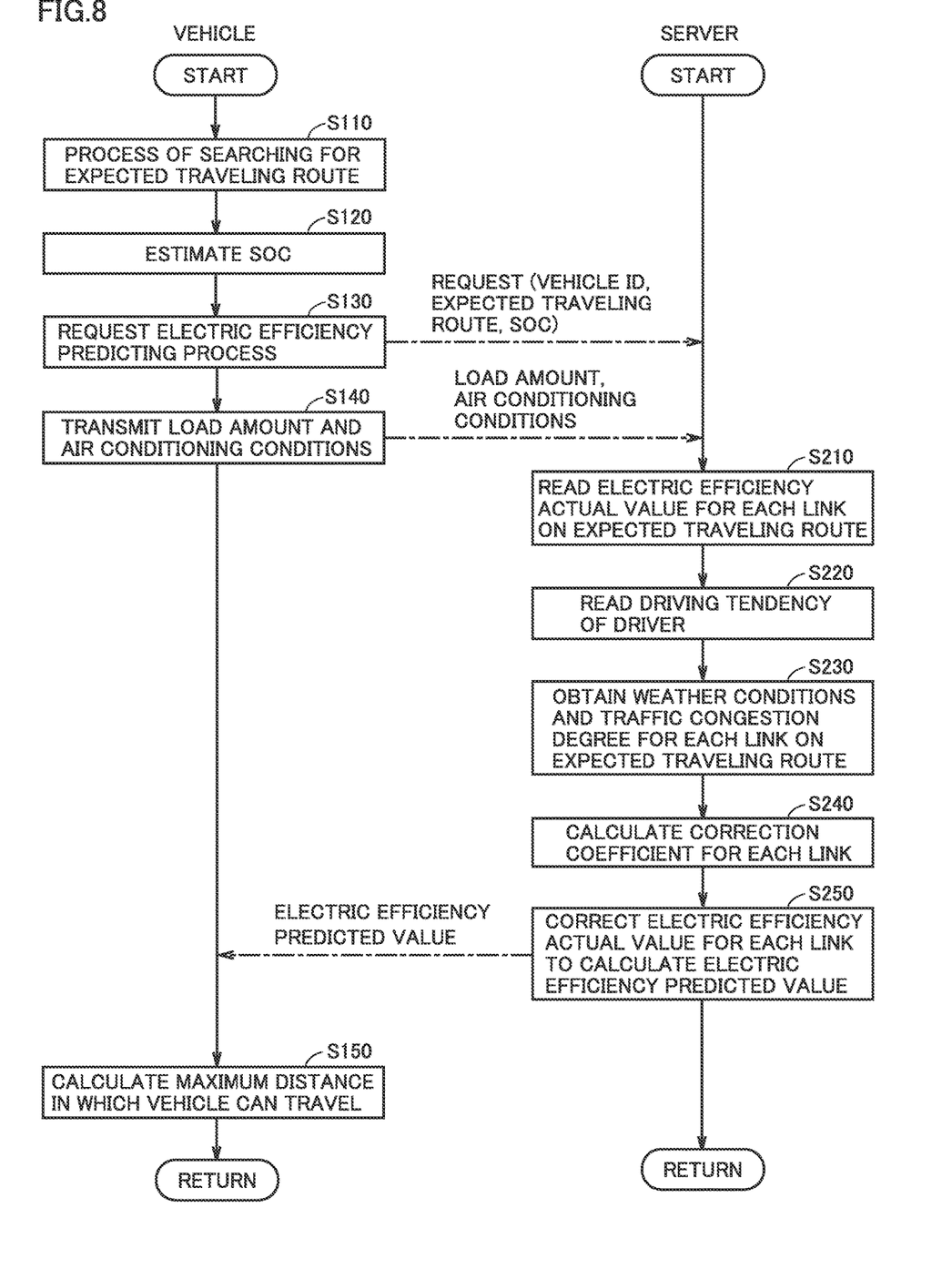
FIG. 8 is a flowchart for illustrating an electric efficiency predicting process in the first embodiment.

FIG. 8 is a flowchart for illustrating an electric efficiency predicting process in the first embodiment. The processes shown in the flowcharts of FIG. 8 and FIGS. 9 and 10 (which are described later) each are performed as it is called from a main routine (not shown) and executed every time predetermined conditions are satisfied (for example, when the user operates navigation device 30, or when the SOC of power storage device 20 falls below a reference value).

A series of processes performed by ECU 100 of vehicle 1 are shown on the left side in the figure while a series of processes performed by processor 11 of server 10 are shown on the right side in the figure. Each of steps (which will be hereinafter abbreviated as "S") included in these flowcharts is basically implemented through software processing by ECU 100 or processor 11, but may be partially or entirely implemented by hardware (an electrical circuit) created in ECU 100 or processor 11. In the following, for the sake of simplification, ECU 100 in vehicle 1 is described as vehicle 1 and processor 11 in server 10 is described as server 10.

In S110, vehicle 1 uses navigation device 30 to perform the process of searching for an expected traveling route from the current location of vehicle 1 to the destination thereof. Furthermore, vehicle 1 estimates the SOC of power storage device 20 (S120). These processes can be performed using a known method. These processes may be performed in another flow (not shown).

Then, in S130, vehicle 1 issues a request to server 10 to perform the process of predicting the electric efficiency on the expected traveling route of vehicle 1. Then, together with the identification information of vehicle 1 (vehicle ID), vehicle 1 transmits the information about the expected traveling route of vehicle 1 and the SOC information about power storage device 20 to server 10. In addition, the location information about the current location of vehicle 1 and the destination thereof may be transmitted to server 10.

Then, the expected traveling route of vehicle 1 may be calculated on the server 10 side.

In S140, vehicle 1 transmits the information about the load amount of vehicle 1 and the information about the air conditioning conditions to server 10. It is to be noted that the order of processes in S110 to S140 may be changed as appropriate. Alternatively, vehicle 1 may collectively transmit these pieces of information and the request for the electric efficiency predicting process.

In S210, from electric efficiency information database 15, server 10 reads the electric efficiency actual value in each link on the expected traveling route of vehicle 1. More specifically, server 10 refers to the vehicle information in vehicle information database 13 to specify the vehicle type of vehicle 1 based on the identification information of vehicle 1. Then, server 10 refers to the electric efficiency information in electric efficiency information database 15, to read the electric efficiency actual value in each link, which corresponds to the vehicle type of vehicle 1.

Furthermore, server 10 refers to the vehicle information to read the information about the driving tendency of the driver, which corresponds to the identification information of vehicle 1 (S220). Furthermore, for each link on the expected traveling route of vehicle 1, server 10 obtains the information about the weather conditions through weather information obtaining device 16, and also obtains the information about the traffic congestion degree through traffic information obtaining device 17 (S230). Also, the order of processes in S220 and S230 may also be changed.

In S240, server 10 refers to the correction map (see FIG. 7) to calculate the correction coefficient for each link. More specifically, server 10 calculates the correction coefficient based on the correction map according to each information showing the state of vehicle 1 and related to: the load amount of vehicle 1, the air conditioning conditions, the driving tendency of a driver, and the weather conditions and the traffic congestion degree in each link.

In S250, for each link on the expected traveling route of vehicle 1, server 10 corrects the electric efficiency actual value using the correction coefficient calculated in S240, thereby calculating the electric efficiency predicted value for each link. For example, the electric efficiency predicted value can be calculated by multiplying the electric efficiency actual value and the correction coefficient for each link. The electric efficiency predicted value in each link is transmitted to vehicle 1.

In S150, using the electric efficiency predicted value calculated by server 10, vehicle 1 calculates a maximum distance in which vehicle 1 can travel (EV traveling distance). More specifically, the distance (length) [unit: km] of each link is already known from the road map information. Accordingly, the amount of power consumption [unit: kWh] in each link can be calculated by using the electric efficiency predicted value [unit: kWh/km]. More simply, distance of link×electric efficiency predicted value=amount of power consumption in link. By totalizing the amount of power consumption in each link, the amount of power consumed from the current location of vehicle 1 to the destination thereof is calculated. On the other hand, the amount of power stored in power storage device 20 can be calculated from: the information about the fully charged capacity of power storage device 20 in vehicle 1; and the information about the SOC of power storage device 20. For example, when the amount of power consumed from the current location of vehicle 1 to the destination thereof exceeds the amount of power stored in power storage device 20, the distance in which the amount of power stored in power storage device 20 is completely consumed (the distance in which the cumulative value of the amount of power consumed from the current location of vehicle 1 in each link reaches the amount of power stored in power storage device 20) is calculated as a EV traveling distance. In vehicle 1, the calculated EV traveling distance is displayed on navigation device 30. In addition, server 10 may also perform the process of calculating this EV traveling distance, and transmit the calculated result to vehicle 1.

As described above, according to the first embodiment, when predicting the electric efficiency in each link on the expected traveling route of vehicle 1, a correction coefficient is calculated using the information showing the status of use of vehicle 1 (an object vehicle information), specifically, the information about the load amount of vehicle 1, the air conditioning conditions, the driving tendency of a driver, the weather conditions, and the degree of traffic congestion on a road. Then, this correction coefficient is used to correct the electric efficiency actual values collected from a number of vehicles (a plurality of vehicles 2, which may include vehicle 1). In this way, the status of use of vehicle 1 that may influence the electric efficiency can be reflected in the electric efficiency predicted value, so that the accuracy of predicting the electric efficiency of vehicle 1 can be improved.

In addition, as a specific example of the information showing the status of use of vehicle 1 (object vehicle information), the load amount of vehicle 1, the air conditioning conditions, the driving tendency of a driver, the weather conditions, and the degree of traffic congestion on a road are listed above, each of which is however not indispensable information. For example, in many cases, the load amount of vehicle 1, the air conditioning conditions, and the driving tendency of a driver are relatively greater in influence upon the electric efficiency than the weather conditions and the degree of traffic congestion on a road. Accordingly, only the information about the load amount of vehicle 1, the air conditioning conditions and the driving tendency of a driver may be used. More limitedly, only the information about the load amount of vehicle 1 and the air conditioning conditions may be used. The object vehicle information may include at least one of: the load amount of vehicle 1; the air conditioning conditions; and the driving tendency of a driver.

In the first embodiment, an explanation has been given with regard to the case where the electric efficiency actual value is corrected using the correction coefficient defined on the correction map, but the correcting manner is not limited thereto. For example, based on the results of experiments or simulations performed in advance, a correction function used for correcting the electric efficiency actual value may be prepared, to calculate the electric efficiency predicted value using this correction function.

Modification of First Embodiment

In the flowchart (see FIG. 8) in the first embodiment, an explanation has been given with regard to an example in which an electric efficiency predicted value is calculated using the correction coefficient on the server 10 side, but the electric efficiency predicted value may be calculated on the vehicle 1 side. In this case, the correction map shown in FIG. 7 is stored in memory 102 of ECU 100 of vehicle 1.

Figure 9:
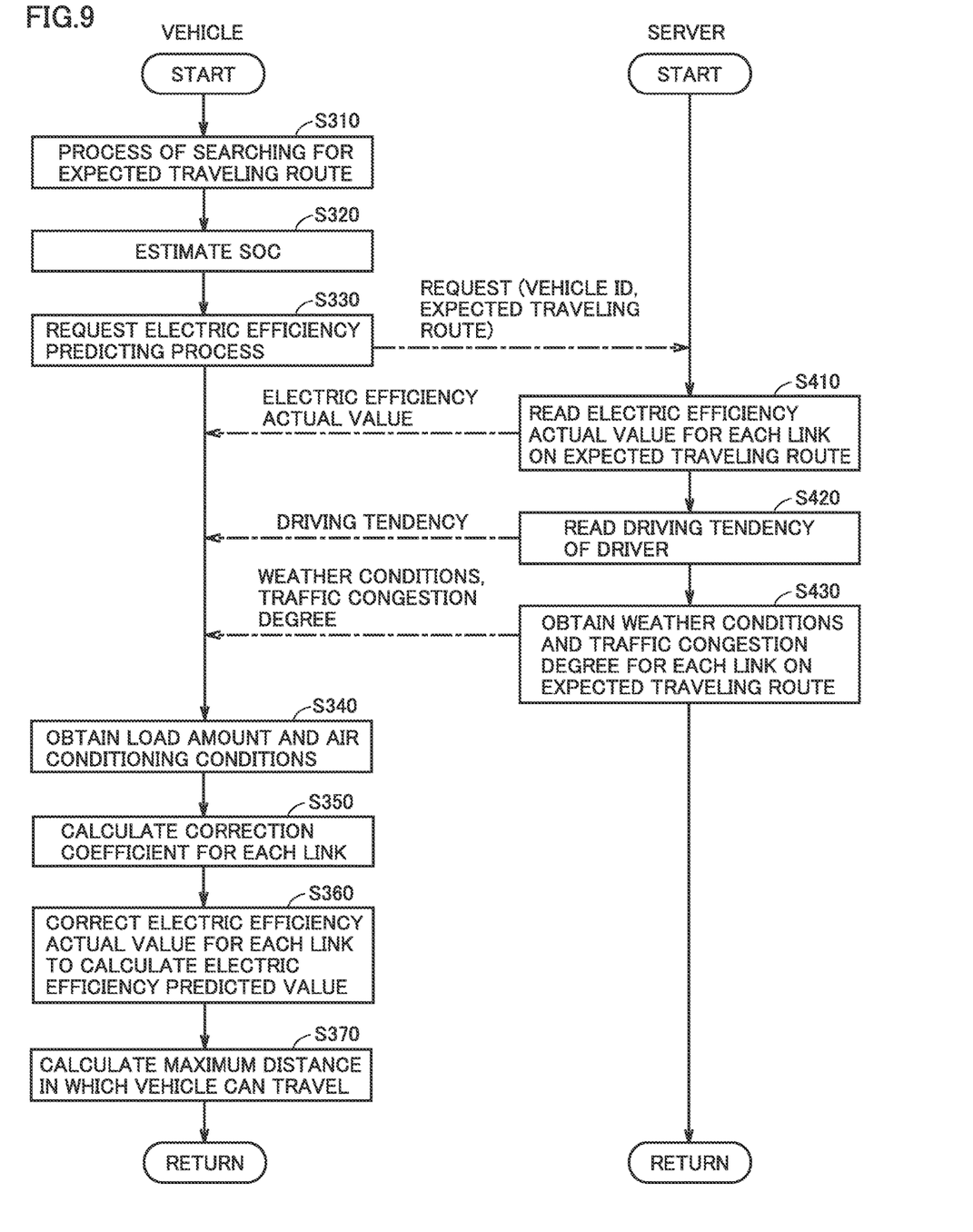
FIG. 9 is a flowchart for illustrating an electric efficiency predicting process in a modification of the first embodiment.

FIG. 9 is a flowchart for illustrating an electric efficiency predicting process in a modification of the first embodiment. Referring to FIG. 9, in S310 and S320, vehicle 1 performs the process of searching for the expected traveling route from the current location of vehicle 1 to the destination thereof, and estimates the SOC of power storage device 20. Then, vehicle 1 issues a request to server 10 to execute the electric efficiency predicting process for the expected traveling route of vehicle 1 (S330). The information about the expected traveling route of vehicle 1 is transmitted to server 10 together with the identification information of vehicle 1.

Then, server 10 reads the electric efficiency actual value in each link on the expected traveling route of vehicle 1 from electric efficiency information database 15 (S410). Furthermore, server 10 refers to the vehicle information to read the information about the driving tendency of a driver, which corresponds to the identification information of vehicle 1 (S420). Furthermore, for each link on the expected traveling route of vehicle 1, server 10 obtains the information about the weather conditions through weather information obtaining device 16 and also obtains the information about the degree of traffic congestion through traffic information obtaining device 17 (S430). The electric efficiency actual value in each link, the information about the driving tendency of a driver of vehicle 1, and the information about the weather conditions and the degree of traffic congestion in each link are transmitted from server 10 to vehicle 1. These pieces of information may be separately transmitted or may be collectively transmitted.

In S340, vehicle 1 obtains the information about the load amount of vehicle 1 and the information about the air conditioning conditions. Then, according to the information about the load amount and the air conditioning conditions of vehicle 1, and each information received from server 10 (the information about the driving tendency of a driver, and the weather conditions and the degree of traffic congestion in each link), vehicle 1 calculates a correction coefficient based on the correction map (see FIG. 7) (S350). Then, vehicle 1 corrects the electric efficiency actual value using the correction coefficient for each link on the expected traveling route of vehicle 1 to thereby calculate the electric efficiency predicted value (S360). Furthermore, using the calculated electric efficiency predicted value, vehicle 1 calculates the maximum distance in which vehicle 1 can travel (S370). The processes in S350 to S370 are different from the processes in the first embodiment (the process performed by server 10) in that the subject executing the processes is vehicle 1, but the details of the processes are basically the same as those described in the first embodiment, and therefore, the detailed description thereof will not be repeated.

As described above, according to the modification of the first embodiment, calculation of the electric efficiency predicted value using a correction coefficient is carried out in vehicle 1. Also in such a configuration, the accuracy of predicting the electric efficiency of vehicle 1 can be improved as in the first embodiment.

Furthermore, as can be apparent from the first embodiment and its modification, vehicle 1 or server 10 can be set appropriately as a subject executing each of the steps. Although not shown, for example, in the processes of S240 and S250 in FIG. 8 and the processes of S350 and S360 in FIG. 9, the correction coefficient may be calculated on the server 10 side, and the calculated correction coefficient may be transmitted to vehicle 1, and then, an electric efficiency predicted value may be calculated on the vehicle 1 side.

Second Embodiment

In the second embodiment, an explanation will be given with regard to the configuration in which, when there is a possibility that vehicle 1 may run out of electricity, server 10 informs vehicle 1 about a charging station before vehicle 1 actually runs out of electricity.

Figure 10:
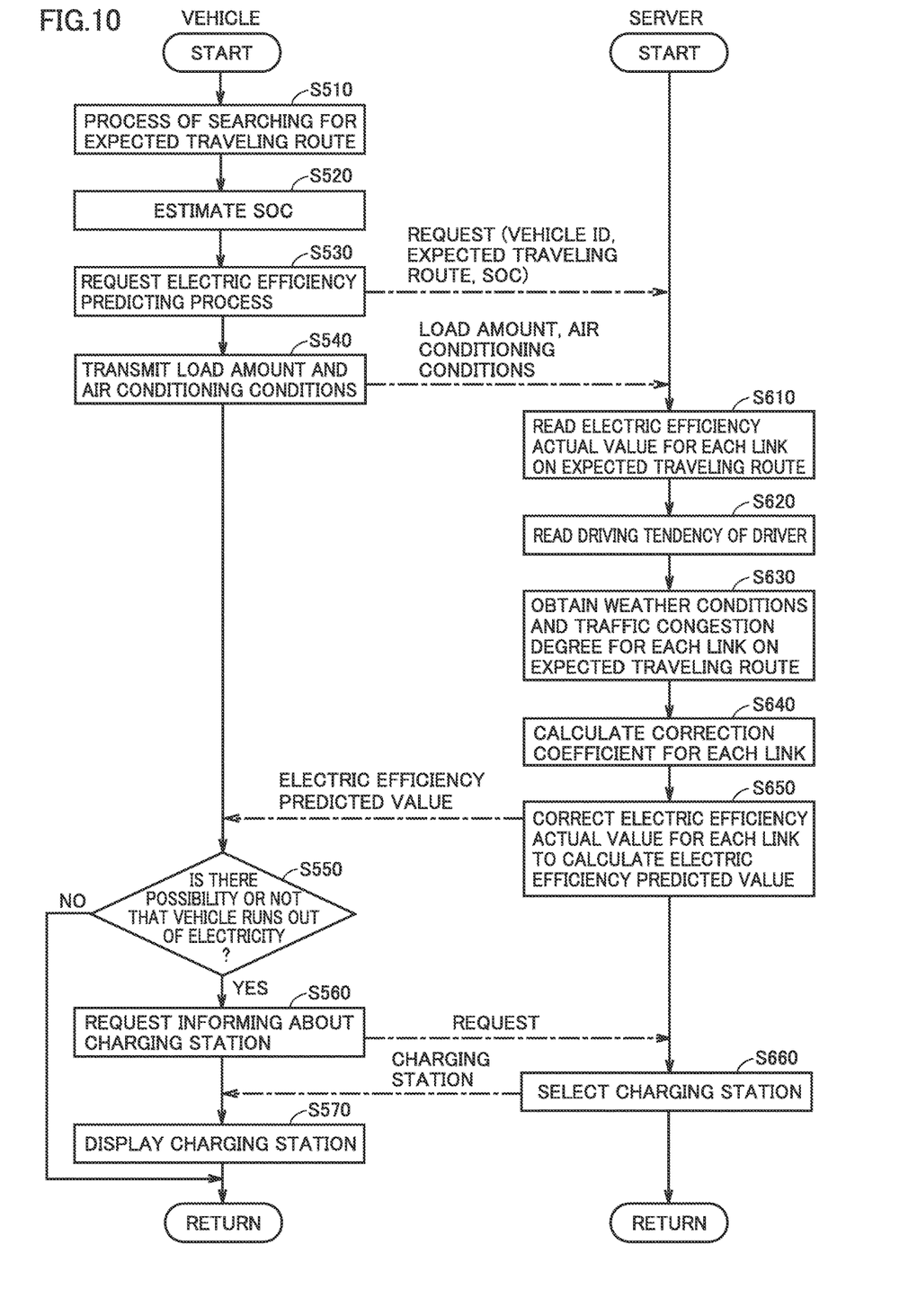
FIG. 10 is a flowchart for illustrating an electric efficiency predicting process in the second embodiment.

FIG. 10 is a flowchart for illustrating an electric efficiency predicting process in the second embodiment. Referring to FIG. 10, since the processes in S510 to S530 and S610 to S650 are the same as the processes in S110 to S130 and S210 to S250 (see FIG. 8) in the first embodiment, the description thereof will not be repeated.

When vehicle 1 receives the electric efficiency predicted value in each link from server 10, vehicle 1 determines in S550 whether there is a possibility or not that vehicle 1 runs out of electricity before vehicle 1 arrives at its destination. Specifically, for example, the amount of power consumption in each of links on the expected traveling route of vehicle 1 is calculated. Then, the amount of power consumption in each link is subtracted sequentially along the expected traveling route of vehicle 1 from the amount of power stored in power storage device 20 at the present of time, thereby calculating the amount of power remaining in power storage device 20 in each link. When the amount of power remaining in power storage device 20 is lower than a prescribed threshold value, it is determined that there is a possibility that vehicle 1 may run out of electricity. This threshold value represents the amount of power that at least exceeds the amount of power required for vehicle 1 to travel from the point where the amount of power remaining in power storage device 20 falls below the threshold value to the charging station around (in the vicinity of) this point.

When it is determined that there is a possibility that vehicle 1 may run out of electricity (YES in S550), vehicle 1 issues a request to server 10 to provide (inform vehicle 1 about) the location information of charging station 9 (S560). In this case, for example, vehicle 1 may transmit, to server 10, also the location information about the point at which the amount of power remaining in power storage device 20 is expected to fall below the threshold value (for example, the location information about a point P shown in FIG. 3).

When server 10 receives a request for providing the information about charging station 9 from vehicle 1, server 10 refers to the charging information stored in charging information database 14, to select charging station 9 in the vicinity of the point at which the amount of power remaining in power storage device 20 falls below the threshold value (S660). The number of charging stations 9 to be selected may be only one, or two or more candidates may be selected as shown in FIG. 3. Also, when selecting charging station 9, it is desirable that not only the location information about charging station 9 but also other information defined as charging information (the information about appropriate charging standards, the information about the number of available chargers, and the like) are taken into consideration. The location information about the charging station selected by server 10 is transmitted to vehicle 1.

Although an explanation has been given with reference to an example of the point at which the amount of power remaining in power storage device 20 falls below a threshold value, server 10 may inform vehicle 1 about a charging station installed in the vicinity of any point before the above-mentioned point. For example, when the user of vehicle 1 desires immediate external charging of power storage device 20, server 10 can select a charging station based on the current location of vehicle 1.

In vehicle 1, the location information about the charging station provided from server 10 is shown on a display of navigation device 30 (S570). Navigation device 30 may perform the process of searching for a route to the charging station, and inform the user of vehicle 1 about the route to the charging station.

As described above, according to the second embodiment, the electric efficiency can be predicted with high accuracy by performing the processes as in the first embodiment. Then, using the electric efficiency predicted value calculated with high accuracy, it is determined whether there is a possibility or not that vehicle 1 may run out of electricity. Furthermore, when it is determined that there is a possibility that vehicle 1 may run out of electricity, vehicle 1 is provided with the location information about the charging station. Thereby, a more appropriate charging station can be informed, for example, so that it becomes possible to reduce the possibility that vehicle 1 actually runs out of electricity.

In addition, an explanation has been given, stating that vehicle 1 may run out of electricity when the amount of power remaining in power storage device 20 falls below a prescribed threshold value. However, as described above, a charging station may be informed in the stage before there occurs a possibility that vehicle 1 may run out of electricity.

FIG. 10 shows a flowchart, which is based on the flowchart in the first embodiment (see FIG. 8), but may be based on the flowchart in the modification of the first embodiment (see FIG. 9).

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An electric efficiency prediction method for an electrically powered vehicle, the electric efficiency prediction method comprising:
    obtaining object vehicle information including information about a status of use of an object vehicle that is an electrically powered vehicle, the object vehicle information including information about a driving tendency of a driver of the object vehicle and information about a load amount of the object vehicle wherein the load amount is an increased amount of weight based on the object vehicle's weight as a reference, and the load amount is estimated from an accelerator pedal position and an acceleration of the object vehicle; and
    for each link connecting nodes virtually set on an expected traveling route of the object vehicle, by using the object vehicle information, correcting an electric efficiency actual value collected from each of a plurality of vehicles to calculate an electric efficiency predicted value in each link for the object vehicle, each of the plurality of vehicles being an electrically powered vehicle.

2. The electric efficiency prediction method for an electrically powered vehicle according to claim 1, further comprising:
    calculating a prediction point at which a state of charge (SOC) of a power storage device mounted in the object vehicle falls below a prescribed value, by using (i) location information about a charging facility capable of supplying charging power to the power storage device, and (ii) the electric efficiency predicted value in each link for the object vehicle; and
    providing the object vehicle with the location information about the charging facility provided in a vicinity of the prediction point.

3. The electric efficiency prediction method for an electrically powered vehicle according to claim 1, wherein
    the object vehicle information further includes information about an operation state of an air conditioner of the object vehicle.

4. A server configured to predict electric efficiency of an electrically powered vehicle, the server comprising:
    storage configured to store (i) map information including a link connecting nodes virtually set on a road, and (ii) electric efficiency information including an electric efficiency actual value calculated based on an electric efficiency result in each link, the electric efficiency result being collected from each of a plurality of vehicles; and
    a processor configured to, for each link on an expected traveling route of an object vehicle, by using information about a status of use of the object vehicle, correct the electric efficiency actual value stored in the storage to predict electric efficiency in each link for the object vehicle, the status of use of the object vehicle including a driving tendency of a driver of the object vehicle and a load amount of the object vehicle wherein the load amount is an increased amount of weight based on the object vehicle's weight as a reference, and the load amount is estimated from an accelerator pedal position and an acceleration of the object vehicle.

5. An electrically powered vehicle comprising:
    a wireless communication device configured to wirelessly communicate with outside the electrically powered vehicle; and
    a processor configured to, for each link on an expected traveling route of the electrically powered vehicle, by using information about a status of use of the electrically powered vehicle, correct an electric efficiency actual value obtained by the wireless communication device to predict electric efficiency in each link for the electrically powered vehicle, wherein
    the status of use of the electrically powered vehicle includes a driving tendency of a driver of the electrically powered vehicle and a load amount of the electrically powered vehicle wherein the load amount is an increased amount of weight based on the electrically powered vehicle's weight as a reference, and the load amount is estimated from an accelerator pedal position and an acceleration of the electrically powered vehicle, and
    the electric efficiency actual value is calculated based on an electric efficiency result collected from each of a plurality of vehicles.

* * * * *